United States Patent [19]

Straka et al.

[11] Patent Number: 5,000,480
[45] Date of Patent: Mar. 19, 1991

[54] SHOW BAR ASSEMBLY FOR TRUCK TYPE VEHICLES

[75] Inventors: Michael J. Straka, Newburgh, N.Y.; Ronald H. Greenberg, Jr.; Larry A. Libey, both of Middlebury, Ind.

[73] Assignee: Sparkomatic Corporation, Milford, Pa.

[21] Appl. No.: 344,126

[22] Filed: Apr. 27, 1989

[51] Int. Cl.$^5$ .................. B60R 21/13; B60R 27/00
[52] U.S. Cl. .................. 280/756; 280/748; 403/260; 285/188
[58] Field of Search .......... 280/756, 748; 296/102; 403/260; 285/188, 189

[56] References Cited

U.S. PATENT DOCUMENTS

| | | | |
|---|---|---|---|
| 4,148,504 | 4/1979 | Rushing | 280/756 |
| 4,171,141 | 10/1979 | Hobrecht | 280/756 |
| 4,202,579 | 5/1980 | Berggren | 280/756 |
| 4,515,393 | 5/1985 | Sauter | 280/756 |
| 4,783,097 | 11/1988 | Browning et al. | 280/756 |
| 4,854,628 | 8/1989 | Halberg | 280/756 |

FOREIGN PATENT DOCUMENTS 1168327  3/1967  United Kingdom ............... 280/756

Primary Examiner—Richard A. Bertsch
Attorney, Agent, or Firm—Mason, Fenwick & Lawrence

[57] ABSTRACT

A show bar assembly for attachment to side panels of a pick-up truck or like vehicles capable of being adjusted and mounted on such vehicles of a plurality of different sizes and configurations and support a variety of automotive light accessories and the like at different locations as chosen by the owner. The show bar assembly comprises an upright front bar formed of three tubular members collectively forming an inverted U-shaped first bar unit to extend above the side panels of the truck and a second bar unit also collectively forming an inverted U-shaped angled bracing bar unit with the top section thereof immediately adjacent and paralleling the top section of the first bar unit. Each of these side tube sections of the first and second bar units have a mounting plate at the respective lower ends thereof for fixing the lower end portions thereof to truck side panels in deliberate mechanical tensioned relation minimizing vibration and looseness between component parts. End abutment connectors rigidly connect adjacent end portions of the top tube sections of the first and second bar unit with their respective associated side tube sections and connecting brackets securing corresponding portions of the top tube section of the first bar unit with the top tube section of the second bar unit.

5 Claims, 3 Drawing Sheets

SHOW BAR ASSEMBLY FOR TRUCK TYPE VEHICLES

BACKGROUND AND OBJECTS OF THE INVENTION

The present invention relates in general to an upwardly projecting styling accessory bar assembly, hereinafter frequently referred to as a show bar or sport bar assembly, to be mounted on pick-up trucks, off-road vehicles and the like, capable of supporting various automotive accessories and being mounted on vehicles of various sizes.

Automotive roll bars and sport bars are pick-up truck or off-road vehicle accessories which have gained considerable popularity recently. Basically, they comprise a wide U-shaped tubular bar system which is attached to the panel sides of the pick-up bed of a pick-up truck, or upper side portions of other styles of off-road vehicles, located rearwardly or just behind the passenger cab. The bar assembly usually spans the width of the cab and projects vertically upwardly to a level approximately at or slightly above the level of the top of the passenger cab, and is usually bolted or welded to the portions of vehicle on which it is mounted. It serves as an appearance accessory as well as a functional roll bar or protective device for the vehicle cab.

Roll bars or sport bars have been manufactured and sold for some time, primarily as off-road accessory attachments for vehicles, and to the best of applicant's knowledge, are available on the market today as "fixed dimension" products individually designed for a specific vehicle type and size. Separate roll bar or sport bar kits of such "fixed dimension" types with different dimensions and/or mounting systems are typically manufactured for different vehicle makes and models, and consequently the supplier is required to stock a large number of different size roll bar or sport bar stocking units. The show bar system of the present invention, in contrast to available fixed dimension designs of numerous sizes, is a single product kit adapted to fit a large variety of pick-up trucks and similar vehicles regardless of the vehicle make, size or model.

An object of the present invention is the provision of the show bar styling accessory for pick-up trucks and the like which can be used with pick-up trucks of a wide variety of sizes, models or makes, wherein the show bar assembly has adjustable width over a large range of adjustments to be custom matched to the bed size of pick-up trucks of many sizes form the full size models to the variety of compact or mini pick-up available on the market. In this way, a single stocking item is available which is easily adjustable to many different vehicles sizes, providing a distinct advantage over built-to-size products. This enables realization of valuable simplification and cost saving benefits at all stages in the manufacturing, warehousing, distribution and retailing process.

Another object of the present invention is the provision of a novel show bar styling accessory for pick-up trucks and the like, which is normally available in a basic "double" show bar configuration, but can be readily expanded into a "triple" show bar using standard component parts.

A further object of the present invention is the provision of a novel show bar styling accessory assembly for pick-up trucks and the like as described in the preceding paragraphs, wherein a modular accessory mounting system is provided which is movable and expandable, permitting installation by the customer at locations of his choice, facilitating achievement of a custom appearance or custom combination of different accessories.

A still further object of the present invention is the provision of a novel show bar styling accessory assembly for pick-up trucks and the like as described in the preceding paragraphs, wherein a deliberate mechanical tension is produced throughout the bar structure to eliminate or minimize looseness and slack between the component parts, to produce a vibration resistant assembly.

Other objects, advantages and capabilities of the present invention will become apparent from the following detailed description, taken in conjunction with the accompanying drawings illustrating the preferred embodiment of the invention.

DETAILED DESCRIPTION OF PREFERRED EMBODIMENTS

Figure 1:
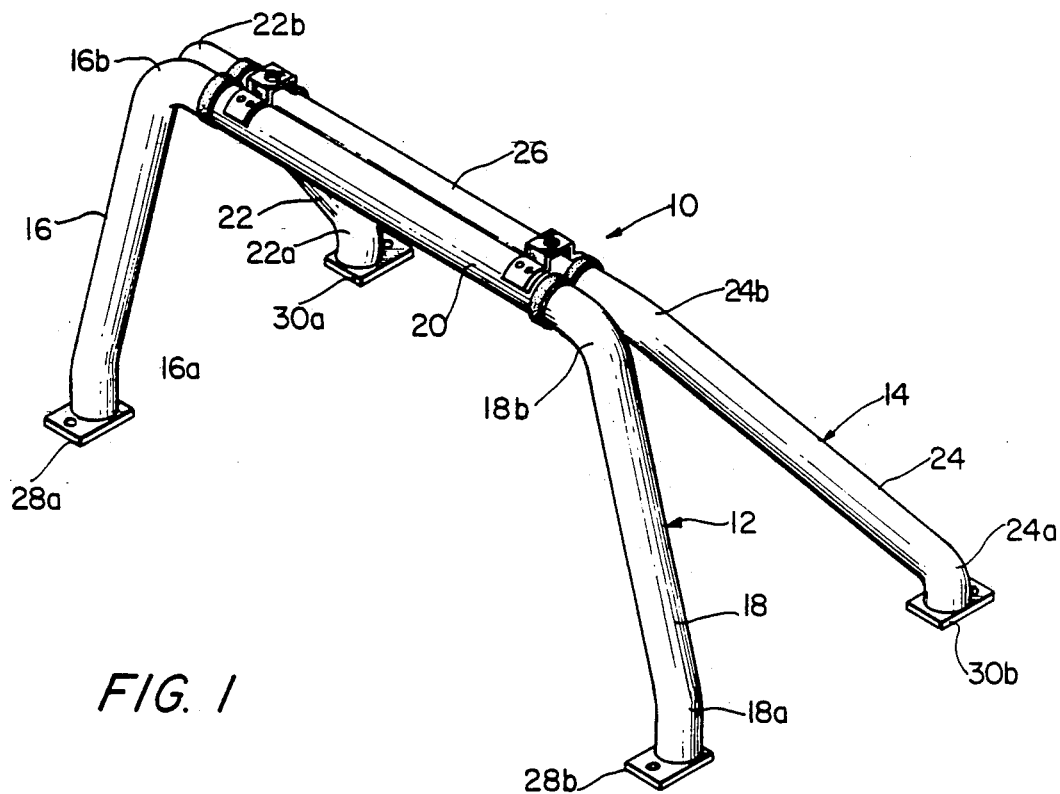
FIG. 1 is a perspective view of a show bar styling accessory assembly for pick-up trucks and the like, embodying the present invention.
Figure 2:
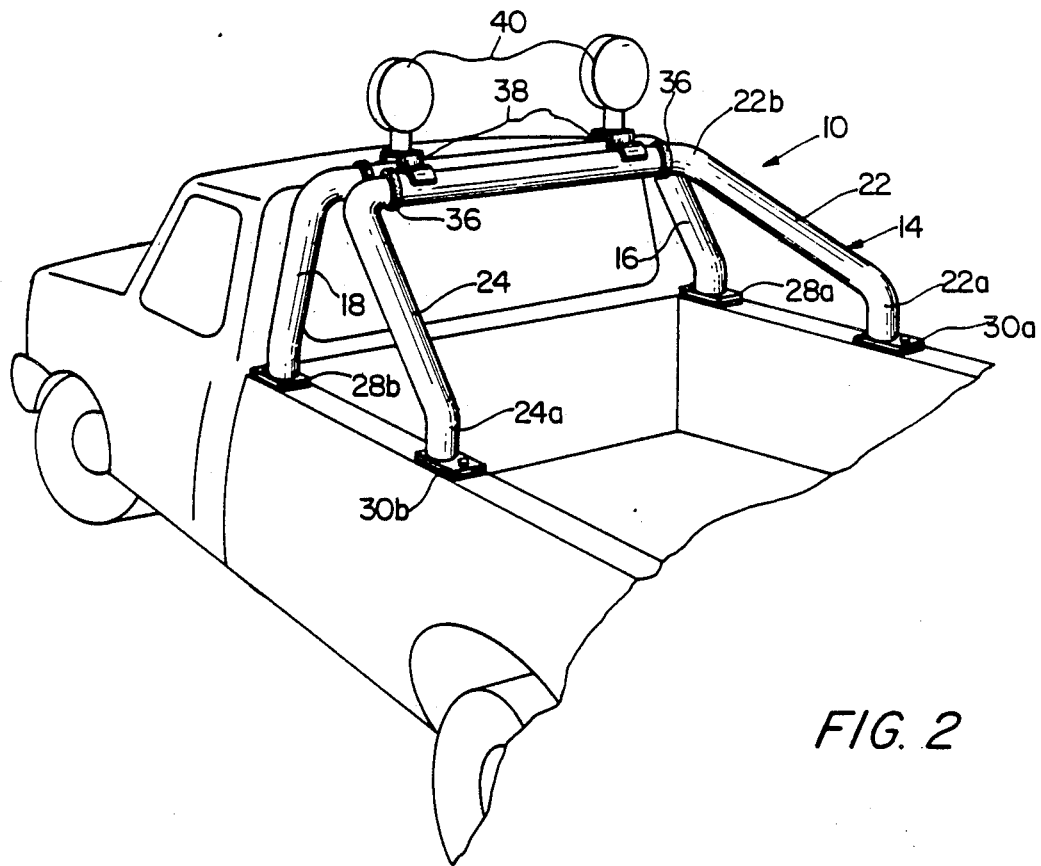
FIG. 2 is a perspective view showing the show bar assembly mounted on the truck bed of a pick-up truck, and showing a pair of off-road light accessories mounted thereon.
Figure 3:
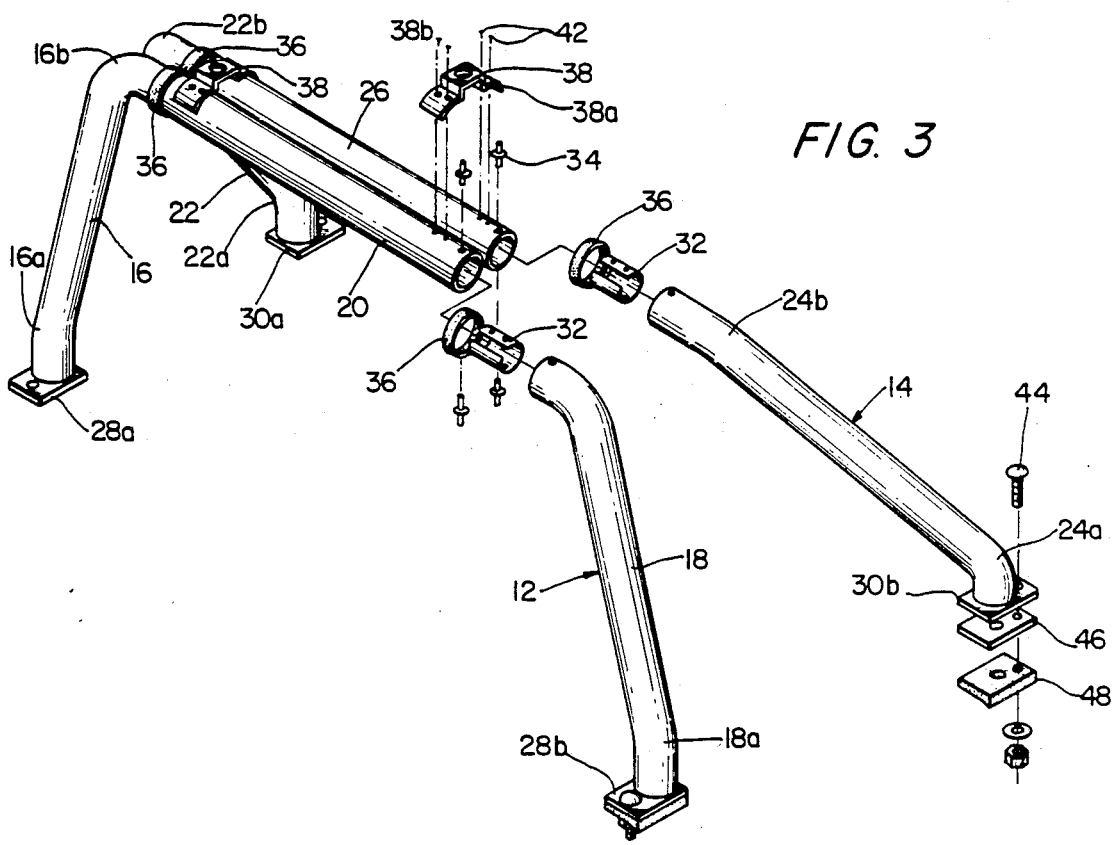
FIG. 3 is an exploded perspective view of the show bar assembly of the "double" show bar configuration.
Figure 4:
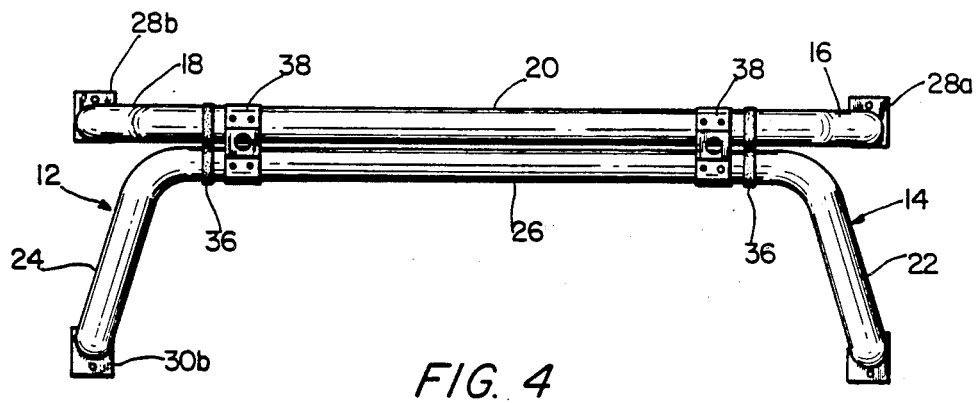
FIG. 4 is a top pain view thereof.
Figure 6:
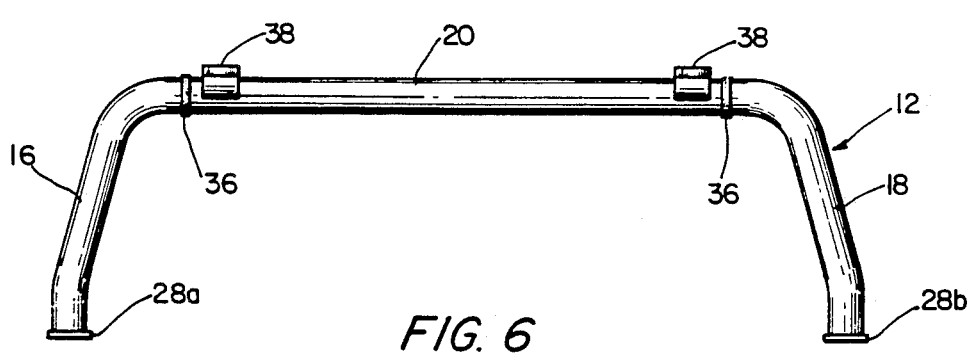
FIG. 6 is a front elevational view thereof.
Figure 5:
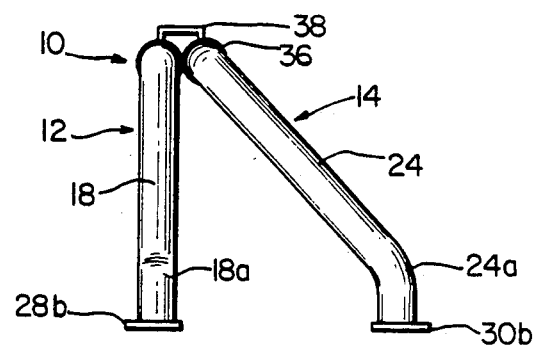
FIG. 5 is a side elevational view thereof.

Referring to the drawings, wherein like reference characters designate corresponding parts throughout the several figures, and particularly to the embodiment shown in FIGS. 1 to 5 inclusive, the show bar assembly of the present invention is indicated generally by the reference character 10, which in this embodiment is a "double" show bar assembly formed of a front upright bar 12 and a rear angled bracing bar 14. Each of the front upright bar 12 and the rear angled bracing bar 14 are 3-piece bars formed of hollow tubes which are of steel or other suitable material such as other metals or plastic. As illustrated, the front upright bar 12 comprises a pair of tubular front side bar sections 16, 18 and a tubular front top bar section 20, all formed of tubing of the same diameter, and the rear angled bracing bar 14 is also formed of a pair of rear side bar sections 22, 24 and a rear top bar section 26, also formed of hollow tubular members of the same diameter. The front side bars 16, 18 are formed with lower angled bends 16a and 18a and upper, almost-right-angular bends 16b, 18b, and include a flat, rectangular planiform side mounting plate 28a, 28b at the lower end of each of the front side leg sections 16, 18, respectively welded to the associated tubular front side bar component.

Similarly, the rear angled bracing right and left side bar sections 22, 24 are formed with lower angle bends 22a, 24a and upper, almost-right-angular bends 22b, 24b, and include flat side mounting plates 30a, 30b at their respective lower ends of the rear side bar sections 22, 24. The top tubular bar section 20, and 26 in each case is a straight tubular bar section having the same inner diameter and outer diameter as the respective associated side bar sections.

The individual tubular sections forming the front upright bar 12, and the tubular sections forming the rear angled bracing bar 14, are assembled together, for example by an internal split connector 32, such as a split tube of steel or similar metallic material, inserted into the hollow bores of the confronting end portions of the front upright bar top tubular section 20 and associated front side bar section 16 or 18, and are also inserted in the bores of the confronting ends of the top section 26 of the rear angled bracing bar 14 and the respective side members thereof 22, 24, and these are fastened together by screws or rivets indicated at 34. An elastic collar 36 of black rubber or the like is fitted over and covers the connection seam, at each joint between the top bar sections and the side bar sections of the respective front upright bar 12 and rear angled bracing bar 14. The front and rear bars 12 and 14 are then rigidly connected to each other by connector brackets 38 each having downwardly convexly curved flange portions 38a conforming to the exterior curvature of portions of the tube sections for the front and rear bars 12, 14 and having an upwardly protruding platform formation 38b for attachment of desired vehicle accessories, such as off-road lights 40, fog lights, or the like thereto. The curved flange portions 38a of the connection brackets 38 are securely fastened to the confronting tubular portions of the bars 12, 14 by screws or rivets 42.

The entire "double" bar assembly formed of the interconnected 3-piece upright bar 12 and 3-piece rear angled bracing bar 14 is mounted to the top of truck side panels by suitable fasteners, such as carriage bolts 44. Elastic mounting pads formed of a first flat elastic pad 46 and a companion contoured elastic pad 48 are provided between the side mounting plates 28a, 28b, 30a, 30b and the truck side panels and are secured at the lower end of each bar side section member serving as shock absorbers in an anti-vibration system provided by the mounting assembly.

Figure 7:
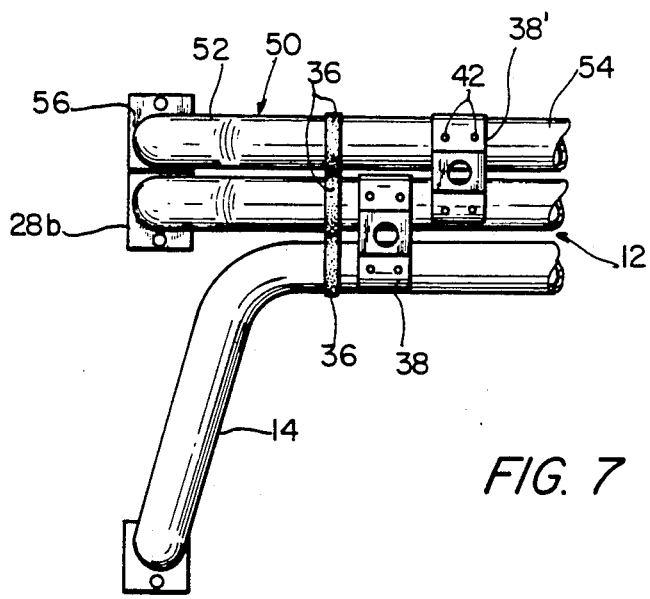
FIG. 7 is a fragmentary top plan view of the "triple" show bar assembly embodying the present invention.
Figure 8:
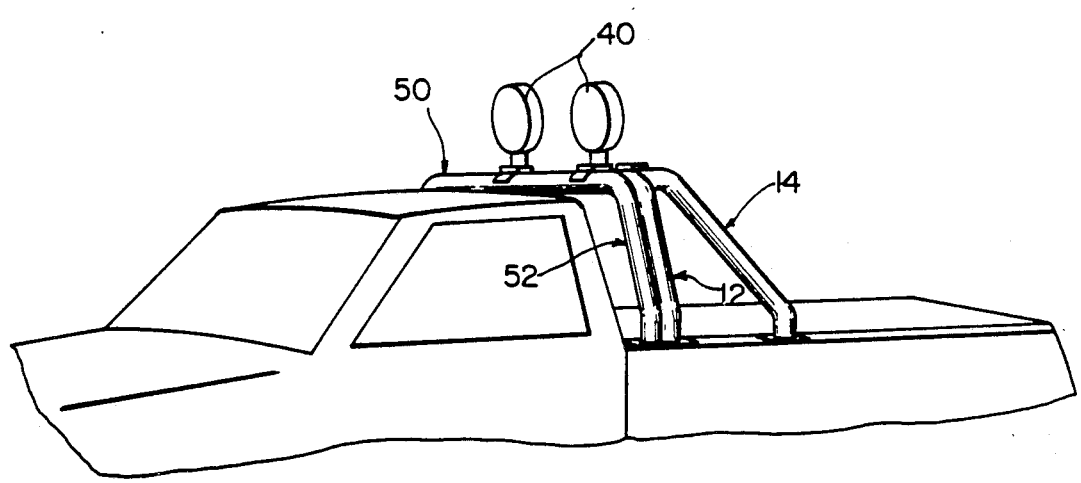
FIG. 8 is a perspective view, viewed from the front and one side, of the triple show bar assembly mounted on the bed of a pick-up truck.

The product is of modular design, so that the user, if he so desires, can expand the basic "double" show bar assembly into a "triple" show bar assembly using standard component parts. In this case, the user simply obtains an additional front upright bar set, indicated at 50 in FIGS. 7 and 8, having tubular side sections 52 at opposite sides thereof and a straight top tubular section 54, like the side tubular sections 16, 18 of the front upright bar 12 in the FIG. 1 embodiment, assembled together by similar split connectors 32 and associated rivets 34, and a seam covering elastic collar 36 in the same manner as the front upright bar 12. An additional connector bracket 38' like the connector bracket 38, with associated screws or rivets 42, interconnects the additional 3-piece upright bar 52 to the front upright bar 12 of the FIG. 1 version, and mounting plates 56 like the mounting plates 28a, 28b are provided at the lower ends of each of these side bar sections 52 of the forwardmost upright bar 50 to be mounted to the truck side panels in a manner similar to a upright bar 12 and angled bracing bar 14. Thus the front bar 12 of the product is an independent "module which, without modification, serves as the front bar in the "double" bar basic product configuration, and also can be used as a separate "add-on" unit in the "triple" bar configuration.

It will be seen that the connector bracket 38, or 38' serves two functions in the overall design First, it is a structural member of the product which connects the front upright bar and the rear angled bar into one unit, and is also used in the same manner to connect the third bar if an add-on unit is used. Secondly, the bracket configuration has a raised portion 38b forming a flat seat having a mounting hole for additional accessory items such as off-road lights, fog lights and the like. Great flexibility is afforded the user or customer in regard to the location and number of accessories to be supported on the sport bar system. The attaching brackets 38, 38' are installed by the customer at locations of his choice. Two brackets must be used as structural connecting members but these two can be placed in a location of choice. Furthermore, one or more additional brackets can be used to increase the number of accessory mounting points. This permits the customer to achieve a custom appearance or custom combination of different accessories.

The show bar assembly of the present invention, because of the elastic mounting pads and brackets connecting the front and rear bars, and because the mounting bolts for the same are eccentrically located, produce a deliberate mechanical tension throughout the bar structure to eliminate any looseness or slack between the component parts, and at the same time cause the component parts to clinch each other, resulting in a vibration resistant final assembly.

A typical roll bar or show bar can be viewed as essentially a free-standing structure simply bolted straight down to a vehicle. Even with shock absorbing pads placed between the bar structure and the vehicle body, vibration and shock is transmitted to the bar structure by the operation of the vehicle. This in turn produces vibration noise, loosens fasteners, and in time leads to undesirable movement of parts, damage to finish surfaces caused by parts rubbing against each other, and the like. Damage to finished surfaces can lead to rust problems and similar deterioration. In the present structure, a reduction in the number of mounting bolts is achieved from the typical 16 or 8 bolts to only 4 bolts. The entire buyer assembly is mounted to the vehicle with a single bolt at each of the 4 mounting plates. These mounting bolts are represented by the carriage bolt 44 shown in FIG. 3. The location of each mounting bolt is purposely eccentric relative to the respective adjoining bar tube, such as the tubular bar side members 16a, 22a or 18a, 24a, and always the mounting bolt is spaced away from the center of the bar structure tubing. In this way, two pairs of opposing eccentric mounting points are created, one pair on each side of the bar structure.

Tightening of the eccentrically located mounting bolts 44 produces uneven compression of the elastic pads 46, 48. This results in a tendency of the bar to tilt in the direction of the mounting bolts 44, or away from the center of the show bar assembly. In other words, the tops of the front and rear bars will want to move away from each other. But because the front and rear bars 12 and 14 are connected at the top by the connector brackets 38, the entire assembly will remain straight, but under constant tension. This tension will remove any looseness out of the assembly In addition, it forces the individual components against each other, which in turn produces a clinching effect as sharp edges, burr and minor misalignments will cause interference fit among the parts.

The configuration of the tubular bars of the present invention are designed for minimal obstruction over the truck bed cargo space and are designed for complete "knocked-down" shipping condition.

I claim:

1. A show bar assembly for attachment to side panels of truck type vehicles capable of being mounted on such vehicles of a plurality of different sizes and configurations and support a variety of automotive accessories at different locations as chosen by the owner, the show bar assembly comprising an upright front bar formed of three tubular members including a pair of upwardly extending side tube sections and a straight top tube section collectively forming an inverted U-shaped first bar unit to extend above the side panels of the truck and a second bar unit also formed of a pair of side tube sections and a straight top tube section collectively forming an inverted U-shaped angled bracing bar unit with the top section thereof immediately adjacent and paralleling the top section of the first bar unit, each of these side tube sections of the first and second bar units having a mounting plate means at the respective lower ends thereof for fixing the lower ends thereof to truck side panels including means assembling said bar units and mounting plate means in deliberate mechanical tension relation minimizing vibration and looseness between component parts, first end abutment connecting means rigidly connecting adjacent end portions of the top tube section of the first bar unit with its associated side tube sections and like end abutment connecting means interconnecting the top tube section of the second bar unit and the adjacent end portions of its associated side tube sections, and connecting bracket means securing corresponding portions of the top tube section of the first bar unit with the top tube section of the second bar unit, said end abutment connecting means comprising split tubular connector inserts having an outer diameter corresponding to the inner diameters of said top and side tube sections to be received in the hollow bores of said adjacent end portions of the top and side tube sections when the latter are disposed in aligned end abutment, connecting fasteners extend through the abutting adjacent end portions of the top and side tube sections and the tubular connector received therein to fix them together, and elastic collar rings for covering each respective joint formed by abutting end portions of said top and side tube sections closely fitted around said abutting end portions at said joints.

2. A side bar assembly for attachment to side panels of truck type vehicles capable of being mounted on such vehicles of a plurality of different sizes and configurations and support a variety of automotive accessories at different locations as chosen by the owner, the show bar assembly comprising an upright front bar formed of three tubular members including a pair of upwardly extending side tube sections and a straight top tube section collectively forming an inverted U-shaped first bar unit to extend above the side panels of the truck and a second bar unit also formed of a pair of side tube sections and a straight top tube section collectively forming an inverted U-shaped angled bracing bar unit with the top section thereof immediately adjacent and paralleling the top section of the first bar unit, each of these side tube sections of the first and second bar units having a mounting plate means at the respective lower ends thereof for fixing the lower ends thereof to truck side panels including means assembling said bar units and mounting plate means in deliberate mechanical tension relation minimizing vibration and looseness between component parts, first end abutment connecting means rigidly connecting adjacent end portions of the top tube section of the first bar unit with its associated side tube sections and like end abutment connecting means interconnecting the top tube section of the second bar unit and the adjacent end portions of its associated side tube sections, and connecting bracket means securing corresponding portions of the top tube section of the first bar unit with the top tube section of the second bar unit, said mounting plate comprising a flat mounting plate member forming a foot at the lower end of each side tube section having a hole therethrough located eccentrically relative to the center axis of the side tube section adjoining the same, elastic mounting pads for each of said flat mounting plates to be located against the under surface of the associated flat mounting plate between the latter and the adjacent side panel of the associated truck, and fastener bolt means to extend through the hole in each respective mounting plate and through the elastic pad associated therewith assembling the front upright first bar unit and rear angled bracing second bar unit in deliberate mechanical tensioned relation.

3. A show bar assembly for attachment to side panels of truck type vehicles capable of being mounted on such vehicles of a plurality of different sizes and configurations and support a variety of automotive accessories at different locations as chosen by the owner, the show bar assembly comprising an upright front bar formed of three tubular members including a pair of upwardly extending side tube sections and a straight top tube section collectively forming an inverted U-shaped bar to extend above the side panels of the truck and a rear angled bracing bar also formed of a pair of side tube sections and a straight top tube section collectively forming an inverted U-shaped angled bracing bar with the top section thereof immediately adjacent and paralleling the top section of the upright front bar, each of these side tube sections of the upright front bar and the rear angled bracing bar having a flat mounting plate at the respective lower ends thereof each provided with a hole therethrough located eccentrically relative to the center axis of the side tube section adjoining the same, elastic mounting pads for each of said flat mounting plates to be located against the under surface of the associated mounting plate between the latter and the adjacent side panel of the associated truck and fastener bolt means to extend through the hole in each respective mounting plate and through the elastic pad associated therewith assembling the front upright bar and rear angled bracing bar in deliberate mechanical tensioned relation minimizing vibration and looseness between component parts, first connecting means rigidly connecting adjacent end portions of the top tube section of the front upright bar with its associated side tube sections and interconnecting the top tube section of the rear angled bracing bar and the adjacent end portions of its associated side tube sections, and connecting bracket means securing corresponding portions of the top tube section of the front upright bar with the top tube section of the rear angled bracing bar.

4. A side bar assembly as defined in claim 3 wherein said end abutment connecting means comprise split tubular connector inserts having an outer diameter corresponding to the inner diameters of said top and side tube sections to be received in the hollow bores of said adjacent end portions of the top and side tube sections when the latter are disposed in aligned end abutment, and connecting fasteners extend through the abutting adjacent end portions of the top and side tube sections and the tubular connector received therein to fix them together.

5. A side bar assembly as defined in claim 3 wherein said end abutment connecting means comprise tubular connector inserts having an outer diameter corresponding to the inner diameters of said top and side tube sections to be received in the hollow bores of said adjacent end portions of the top and side tube sections when the latter are disposed in aligned end abutment, connecting fasteners extend through the abutting adjacent end portions of the top and side tube sections and the tubular connector received therein to fix them together, and elastic collar rings for covering each respective joint formed by abutting end portions of said top and side tube sections closely fitted around said abutting end portions at said joints.

* * * * *